United States Patent
Inose et al.

(10) Patent No.: US 11,142,960 B2
(45) Date of Patent: Oct. 12, 2021

(54) THREADED CONNECTION FOR OIL WELL

(71) Applicants: Nippon Steel Corporation, Tokyo (JP); Vallourec Oil and Gas France, Aulnoye-Aymeries (FR)

(72) Inventors: Keita Inose, Tokyo (JP); Masaaki Sugino, Tokyo (JP); Takashi Okada, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 254 days.

(21) Appl. No.: 16/482,817

(22) PCT Filed: Feb. 21, 2018

(86) PCT No.: PCT/JP2018/006296
§ 371 (c)(1),
(2) Date: Aug. 1, 2019

(87) PCT Pub. No.: WO2018/163829
PCT Pub. Date: Sep. 13, 2018

(65) Prior Publication Data
US 2019/0383106 A1    Dec. 19, 2019

(30) Foreign Application Priority Data

Mar. 8, 2017    (JP) .............................. JP2017-043789

(51) Int. Cl.
*F16L 15/00*    (2006.01)
*E21B 17/042*    (2006.01)

(52) U.S. Cl.
CPC .......... *E21B 17/042* (2013.01); *F16L 15/006* (2013.01)

(58) Field of Classification Search
CPC ...... F16L 15/001; F16L 15/006; E21B 17/042
See application file for complete search history.

(56) References Cited

U.S. PATENT DOCUMENTS 5,363,545 A    11/1994    Hirano et al.
2008/0191479 A1*    8/2008    Suzuki .................. E21B 17/042
                                                                        285/334

(Continued)

FOREIGN PATENT DOCUMENTS

JP    S629085 A    1/1987
JP    H0280886 A    3/1990
JP    3726302 B2    12/2005

OTHER PUBLICATIONS

English Abstract & Family List of JP 3726302 B2.
English Abstract & Family List of JP H0280886 A.

*Primary Examiner* — David Bochna
(74) *Attorney, Agent, or Firm* — Banner & Witcoff, Ltd.

(57) ABSTRACT

High sealing performance is provided in a threaded connection used for pipes for oil wells with large wall thickness and with a connection efficiency smaller than 1. A threaded connection (10) connects pipes for oil wells (1). The threaded connection (10) includes two pins (11) and a tubular coupling. Each of the pins (11) is provided on an end of the pipe for oil wells (1) and is in continuity with the pipe body (12), which has a wall thickness not smaller than 12 mm. The coupling (2) includes two boxes (21) and a recess portion (22). The box (21) is provided on both ends of the coupling (2). The recess portion (22) has a length not smaller than 10 mm. The threaded connection (10) has a connection efficiency smaller than 1. When the wall thickness of the pipe body (12) is expressed as $t_{pipe}$, the wall thickness and length of the recess portion (22) are expressed as $t_1$ and $2 \times L_1$, respectively, and the length of each of the boxes (21) is expressed as $L_2$, and if the following expressions (1) and (2) define T and L, then, T and L satisfy the following expression (3):

(Continued)

$$T = \frac{t_1}{t_{pipe}} \quad (1)$$

$$L = \frac{L_1}{L_1 + L_2} \quad (2)$$

$$T \cdot L^{1/15} > 1.4 \quad (3)$$

1 Claim, 5 Drawing Sheets

(56) References Cited

U.S. PATENT DOCUMENTS

| | | | |
|---|---|---|---|
| 2011/0241340 A1* | 10/2011 | Okada | E21B 17/042 |
| | | | 285/333 |
| 2016/0319966 A1* | 11/2016 | Kawai | E21B 17/042 |
| 2019/0056049 A1* | 2/2019 | Kawai | E21B 17/042 |
| 2019/0338872 A1* | 11/2019 | Sugino | E21B 17/042 |
| 2019/0383106 A1* | 12/2019 | Inose | F16L 15/006 |
| 2020/0248509 A1* | 8/2020 | Sugino | E21B 17/042 |
| 2020/0278056 A1* | 9/2020 | Oku | E21B 17/042 |
| 2020/0370683 A1* | 11/2020 | Glukhih | E21B 17/042 |

* cited by examiner

THREADED CONNECTION FOR OIL WELL

TECHNICAL FIELD

The present disclosure relates to a threaded connection, and more particularly, to a threaded connection for connecting pipes for an oil well by means of a tubular coupling.

BACKGROUND ART

In oil wells or natural-gas wells (hereinafter collectively referred to as "oil wells" or the like), for example, steel pipes called pipes for oil wells are used. The pipes for oil wells are connected with each other by means of threaded connections and are placed in oil wells.

Such threaded connections are generally categorized as integral-type connections and coupling-type connections. An integral-type connection directly connects the pipes for oil wells. More specifically, a female thread is provided on the inner periphery of an end of the pipe for oil wells and a male thread is provided on the outer periphery of an end of the pipe for oil wells, and the male thread of one pipe for oil wells is screwed into the female thread of another pipe for oil wells such that the pipes for oil wells are connected. A coupling-type connection connects the pipes for oil wells using a coupling. More specifically, female threads are provided on the inner peripheries of both ends of a coupling and a male thread is provided on the outer periphery of an end of the pipe for oil wells, and the male thread is screwed into the associated female thread of the coupling such that the pipes for oil wells are connected.

The end portion of the pipe for oil wells on which a male thread is provided includes an element to be inserted into a female thread, and thus is usually referred to as "pin". The end portion of the pipe for oil wells or coupling on which a female thread is provided includes an element for receiving a male thread, and thus is referred to as "box".

In recent years, oil wells have become deeper and deeper. Usually, the pipes for oil wells with large wall thickness and thus having high pressure resistance are used in deep wells. A threaded connection for connecting the pipes for oil wells with large wall thicknesses are not only required to have high strength and high sealing performance, but are also subject to tight restrictions on outer-diameter dimensions to allow multiple the pipe for oil wells to be placed inside each other.

To reduce the outer-diameter dimensions of a connection, the wall thickness of at least one of the pin and box may be reduced. Threaded connections with a reduced wall thickness or reduced wall thicknesses of the pin and/or box include, for example, slim-type connections. A slim-type threaded connection has an outer diameter substantially equal to the outer diameter of the body of the pipe for oil wells. A slim-type threaded connection has a connection efficiency smaller than 1. The connection efficiency of a connection is the ratio of the tensile strength of the connection to the tensile strength of the body of the pipe for oil wells, and is defined as the area of a transverse section of the portion of the connection that has the smallest area of resistance to a tensile load when the connection has been made up (usually referred to as "critical section") divided by the area of a transverse section of the body of the pipe for oil wells.

The maximum value of internal pressure during a seal test for a threaded connection depends on the outer diameter and wall thickness of the body of the pipe for oil wells. Accordingly, a relatively high internal pressure is repeatedly applied to a slim-type threaded connection during a seal test compared with other threaded connections. As such, the box may be deformed to increase its diameter such that the contact force of the seal formed by the pin and box sealing surfaces contacting each other decreases, potentially leading to a leak.

The sealing performance of a threaded connection is typically improved by devising various shapes for the thread or seal. For example, Patent Document 1 (JP H02(1990)-80886 A) describes a technique to remove the interference margin as measured in a radial direction of a portion of the pin with perfect threads that is closest to the tip of the pin, thereby preventing the decrease in the interference margin in the seal caused by the mating of the threads. Patent Document 2 (Japanese Patent No. 3726302) describes a technique to increase sealing performance by constructing a non-threaded portion of the pin that forms a seal in such a way that the portion has a two-section taper structure, and making the tapering of the portion adjacent to the tip of the pin smaller than the tapering of the other portion.

The following prior art documents are incorporated herein by reference.

Patent Document 1: JP H02(1990)-80886 A
Patent Document 2: Japanese Patent No. 3726302

SUMMARY OF THE DISCLOSURE

When a slim-type threaded connection with a connection efficiency smaller than 1 undergoes a seal test or is being used, an internal pressure is repeatedly applied to the connection such that the box can easily be deformed to increase its diameter, potentially leading to a leak. The deformation of the box with increased diameter caused by repeated application of the internal pressure is difficult to reduce by devising new shapes for the thread or seal. Thus, in the case of a slim-type threaded connection, it is difficult to provide high sealing performance by devising various shapes for the thread or seal, as is conventionally done.

An object of the present disclosure is to provide high sealing performance in a threaded connection used for pipes for oil wells with large wall thickness and with a connection efficiency smaller than 1.

A threaded connection according to the present disclosure is a threaded connection for connecting pipes for an oil well. The threaded connection includes two pins and a tubular coupling. Each of the pins is provided on an end of a corresponding one of the pins and is in continuity with a body of the corresponding pipe having a wall thickness not smaller than 12 mm. The coupling includes two boxes and a recess portion. The boxes are provided on both ends of the coupling. Each of the boxes are capable of being made up on the associated pin. The recess portion is located between the two boxes. Each of the pins includes a nose, a pin shoulder surface, a male thread, and a pin sealing surface. The nose forms a tip portion of the pin. An outer peripheral surface of the nose is not in contact with the box made up on the pin. The pin shoulder surface is formed at a tip surface of the nose. The male thread is provided on an outer peripheral surface of the pin and located closer to the body of the corresponding pipe than the nose. The male thread is a tapered thread. The pin sealing surface is provided on the outer peripheral surface of the pin and located between the nose and the male thread. Each of the boxes includes a female thread, a box shoulder surface, and a box sealing surface. The female thread is provided on an inner peripheral surface of the coupling to correspond to the male thread. The female thread is a tapered thread. The box shoulder surface is located closer to a middle of the coupling as determined along a pipe-axis direction than the female thread. The box shoulder surface is in contact with the pin shoulder surface when the connection has been made up to form a shoulder. The box sealing surface is provided on the inner peripheral surface of the coupling and is located between the female thread and the box shoulder surface. The box sealing surface is in contact with the pin sealing surface when the connection has been made up to form a seal. The recess portion has a length not smaller than 10 mm as measured in the pipe-axis direction. The connection has a connection efficiency smaller than 1. The connection efficiency is calculated by A1/A2, where A1 is the area of a transverse section of the coupling as measured at the ends, adjacent to the seal, of the male thread and the female thread engaging each other when the connection has been made up (transverse section of the portion of the connection that has the smallest area of resistance to a tensile load when the connection has been made up), and A2 is the area of a transverse section of the body. When the wall thickness of the body is expressed as $t_{pipe}$, the wall thickness of the recess portion and the length of the recess portion as measured in the pipe-axis direction are expressed as $t_1$ and $2 \times L_1$, respectively, and the length of each of the boxes as measured in the pipe-axis direction is expressed as $L_2$, and when the following expression (1) defines T and the following expression (2) defines L, T and L satisfy the following expression (3).

$$T = \frac{t_1}{t_{pipe}} \quad (1)$$

$$L = \frac{L_1}{L_1 + L_2} \quad (2)$$

$$T \cdot L^{1/15} > 1.4 \quad (3)$$

The present disclosure provides high sealing performance in a threaded connection used for pipes for oil wells with large wall thickness and with a connection efficiency smaller than 1.

EMBODIMENTS FOR CARRYING OUT THE INVENTION

As discussed above, in a slim-type threaded connection, it is difficult to prevent the deformation of the box with increased diameter caused by the internal pressure even when one devises a new shape for the thread or seal. In coupling-type threaded connection, the stiffness of the coupling may be increased to prevent the box from being deformed with increased diameter. That is, the outer diameter and wall thickness of the coupling may be increased to prevent the box from being deformed with increased diameter. However, since a slim-type threaded connection has tight restrictions on the outer-diameter dimensions, there is a limit to the increase in the outer diameter of the coupling.

Typically, the portion of the coupling located between the boxes (hereinafter referred to as recess portion) has a larger wall thickness than the portions with the box seals, and thus has a higher stiffness. As such, the recess portion does not increase its diameter significantly when an internal pressure is applied to the threaded connection, and is thus thought to have the function to reduce the diameter of the box sealing surface.

The present inventors focused on the recess portion of the coupling and attempted to improve sealing performance by devising a new construction of the recess portion. The present inventors considered how to construct the recess portion to provide high sealing performance without increasing the outer diameter of the coupling.

Figure 1:
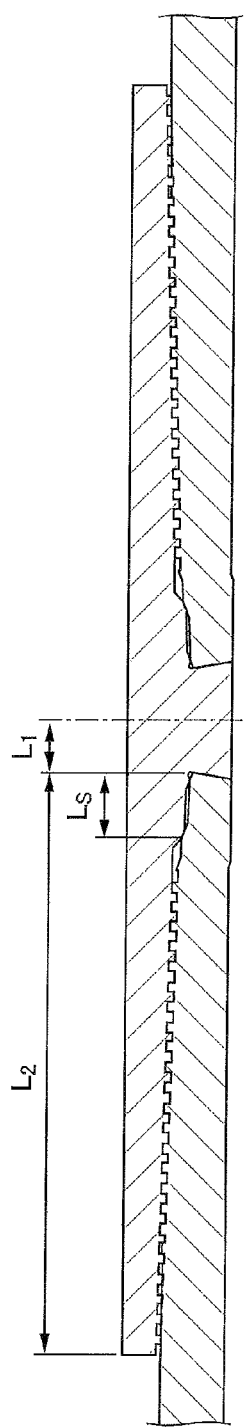
FIG. 1 is a schematic longitudinal cross-sectional view of a threaded connection used for considering how to construct a coupling.

FIG. 1 is a schematic longitudinal cross-sectional view of a coupling-type threaded connection. In the coupling of this threaded connection, ½ of the distance of the box shoulder surfaces as measured in the pipe-axis direction is denoted by $L_1$, the length of the box as measured in the pipe-axis direction by $L_2$, and the distance between the box-shoulder surface and the middle of the contact of the box sealing surface as measured in the pipe-axis direction by Ls. Although the length of the recess portion as measured in the pipe-axis direction is twice $L_1$, $L_1$ will be referred to as the length of the recess portion, for ease of explanation.

Figure 2:
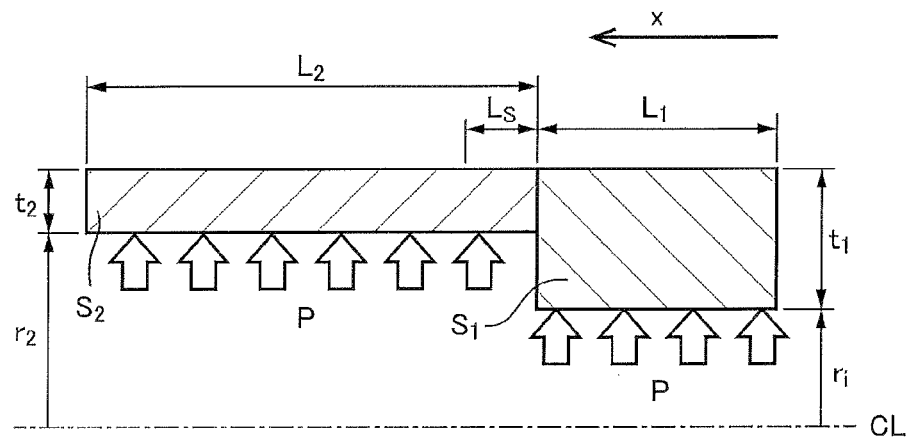
FIG. 2 is a longitudinal cross-sectional view of a model of a two-portion cylinder that approximates the coupling of the threaded connection shown in FIG. 1.

A model of a two-portion cylinder that approximates the coupling shown in FIG. 1 was created and the necessary and sufficient stiffness for this model was investigated using elastic shell theory. FIG. 2 is a longitudinal cross-sectional view of the model of a two-portion cylinder used for this investigation. In the model of a two-portion cylinder shown in FIG. 2, the cylindrical portion S1 with a larger wall thickness corresponds to the recess portion, while the cylindrical portion S2 with a smaller wall thickness corresponds to the box.

In the case of a uniform cylinder, the amount of deflection w of the cylindrical shell caused by an internal pressure P, as measured at a position where the effects of an end portion are negligible, is given by expression (4), provided below, based on material mechanics. The amount of deflection w is ½ of the amount of increase in the diameter of the cylindrical shell caused by the internal pressure P. In expression (4), E is the Young's modulus, v is the Poisson's ratio, r is the median diameter of the cylinder, and t is the wall thickness of the cylinder.

$$w = \frac{Pr^2}{Et} + \frac{vP}{E}(1+v) \quad (4)$$

The right side of expression (4) is the particular solution to this problem. Supposing that the amount of deflection in a direction away from the axis of the cylinder is positive, the fundamental equation of the cylindrical shell on which the internal pressure P acts is given by the following expression, (5):

$$w = \frac{Pr^2}{Et} + \frac{vP}{E}(1+v) + \\ e^{\beta x}(C_1 \cos \beta x + C_2 \sin \beta x) + e^{-\beta x}(C_3 \cos \beta x + C_4 \sin \beta x) \quad (5)$$

If the amounts of deflection in the cylinders S1 and S2 are denoted by $w_1$ and $w_2$, $w_1$ and $w_2$ are given by the following expressions, (6) and (7). $r_i$ in the expressions (6) and (7) is the inner diameter of the recess portion of the coupling, that is, the inner diameter of the cylindrical portion S1.

$$w_1 = \frac{P(r_i + t_1/2)^2}{E_1 t_1} + \frac{v_1 P}{E_1}(1+v_1) + \\ e^{\beta_1 x}(C_{11} \cos \beta_1 x + C_{12} \sin \beta_1 x) + e^{-\beta_1 x}(C_{13} \cos \beta_1 x + C_{14} \sin \beta_1 x) \quad (6)$$

$$w_2 = \frac{P(r_i + t_1 + t_2/2)^2}{E_2 t_2} + \frac{v_2 P}{E_2}(1+v_2) + \\ e^{\beta_2 x}(C_{21} \cos \beta_2 x + C_{22} \sin \beta_2 x) + e^{-\beta_2 x}(C_{23} \cos \beta_2 x + C_{24} \sin \beta_2 x) \quad (7)$$

If the pipe-axis direction of the coupling represents the x-axis and the middle of the coupling as determined along the pipe-axis direction represents the origin of the x-axis, then, the angle of deflection $\theta_1$ and the shearing force $Q_1$ at the right end (x=0) of the cylindrical portion S1 in FIG. 2 is zero. Thus, the following expressions, (8) and (9), are true:

$$\theta_{1(x=0)} = -D_1 \frac{\partial w_1}{\partial x}\bigg|_{x=0} = 0 \quad (8)$$

$$Q_{1(x=0)} = -D_1 \frac{\partial^3 w}{\partial x^3}\bigg|_{x=0} = 0 \quad (9)$$

Since the cylindrical portions S1 and S2 are in continuity, the angle of deflection $\theta_1$ of the cylindrical portion S1 and the angle of deflection $\theta_2$ of the cylindrical portion S2 are equal when $x=L_1$. Thus, the amounts of deflection $w_1$ and $w_2$ in the cylindrical portions S1 and S2 are equal, the bending moments $M_1$ and $M_2$ are equal, and the shearing forces $Q_1$ and $Q_2$ are equal. That is, the following expressions (10) to (13), are true.

$$w_{1(x=L_1)} = w_{2(x=L_1)} \quad (10)$$

$$\theta_{1(x=L_1)} = \theta_{2(x=L_1)} \quad (11)$$

$$M_{1(x=L_1)} = M_{2(x=L_1)} \quad (12)$$

$$Q_{1(x=L_1)} = Q_{2(x=L_1)} \quad (13)$$

Further, since the left end of the cylindrical portion S2 in FIG. 2 ($x=L_1+L_2$) is a free end, the following expressions, (14) and (15), are true.

$$M_{2(x=L_1+L_2)} = 0 \quad (14)$$

$$Q_{2(x=L_1+L_2)} = 0 \quad (15)$$

By solving expressions (8) to (15) simultaneously, the unknown quantities $C_{11}$ to $C_{14}$ and $C_{21}$ to $C_{24}$ are determined. Thus, the amounts of deflection $w_1$ and $w_2$ of the cylindrical portions S1 and S2, respectively, are determined from expressions (6) and (7). If $x=L_1+L_s$ is substituted into expression (7), the amount of deflection of the seal may be given by the following expression, (16). $L_s$ is the distance between the border between the cylindrical portions S1 and S2 and the position corresponding to the middle of the contact of the box sealing surface as measured in the x-direction.

$$w_2 = \frac{P(r_i + t_1 + t_2/2)^2}{E_2 t_2} + \frac{v_2 P}{E_2}(1+v_2) + \\ e^{\beta_2 x}(C_{21} \cos \beta_2(L_1 + L_s) + C_{22} \sin \beta_2(L_1 + L_s)) + \\ e^{-\beta_2 x}(C_{23} \cos \beta_2(L_1 + L_s) + C_{24} \sin \beta_2(L_1 + L_s)) \quad (16)$$

The present inventors used parameters T, L and a, defined by the following expression, (17), to determine the effects of the wall thickness of the recess portion and the length thereof as measured in the pipe-axis direction on the sealing performance.

$$T = \frac{t_1}{t_{pipe}}, \quad L = \frac{L_1}{L_1 + L_2}, \quad a = \frac{\delta - 2 w_2(L_s)}{\delta} \quad (17)$$

T is a parameter obtained by normalizing the wall thickness $t_1$ of the recess portion with the wall thickness $t_{pipe}$ of the body of the pipe. L is a parameter obtained by normalizing the length $L_1$ of the recess portion with the length of a half of the coupling, $L_1+L_2$. a is a parameter obtained by normalizing the real amount of sealing interference found when the coupling has increased its diameter, $\delta-2w_2(L_s)$, with the design amount of sealing interference during make-up, $\delta$. The amount of deflection $w_2$ used in expression (17) is the amount of deflection $w_2$ of the seal given by expression (16).

Figure 3:
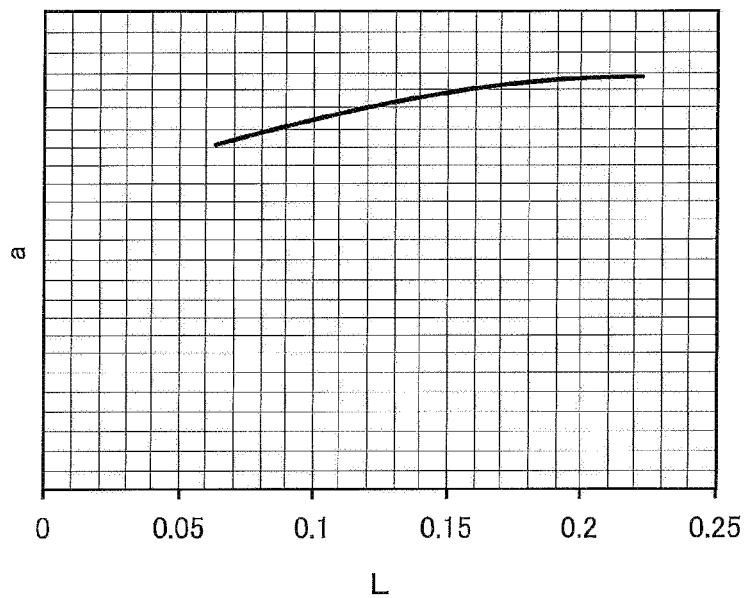
FIG. 3 is a graph showing a relationship between a parameter a relating to the amount of seal interference and a parameter L relating to the length of the recess portion of the coupling.
Figure 4:
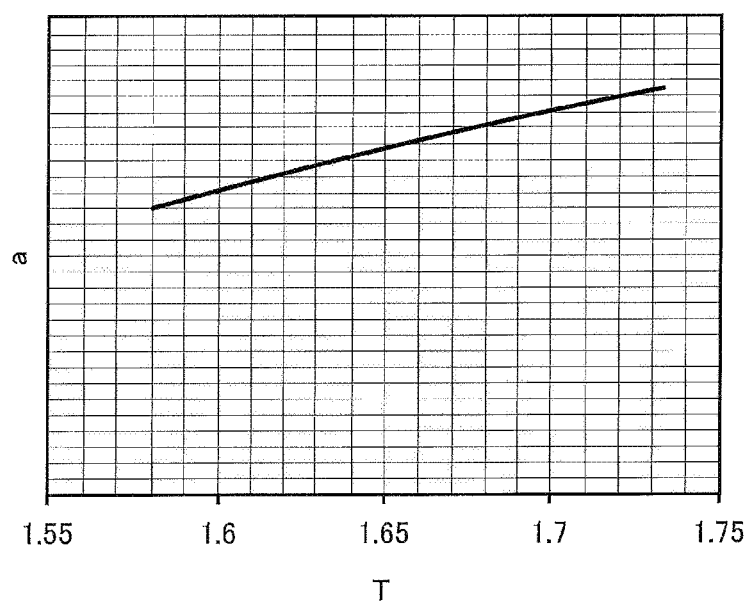
FIG. 4 is a graph showing a relationship between the parameter a relating to the amount of seal interference and a parameter T relating to the wall thickness of the recess portion of the coupling.

FIG. 3 shows a relationship between L and a where T is constant and the length $L_1$ of the recess portion varies. FIG. 4 shows a relationship between T and a where L is constant and the wall thickness $t_1$ of the recess portion varies. The relationships shown in FIGS. 3 and 4 may be given by the following expressions, (18) and (19), respectively. f(T) is an arbitrary function that does not contain L, g(L) is an arbitrary function that does not contain T, and m is a constant.

$$a(T,L) \propto f(T) \cdot L^{1/m} \quad (18)$$

$$a(T,L) \propto T \cdot g(L) \quad (19)$$

The following expression, (20), may be derived from expressions (18) and (19):

$$a(T,L) \propto T \cdot L^{1/m} \quad (20)$$

As discussed above, a is a parameter obtained by normalizing the real amount of seal interference found when the diameter of the coupling has increased with the amount of seal interference during make-up. As such, the greater the value of a, the higher the contact surface pressure at the seal during application of the internal pressure becomes, improving sealing performance. Sufficient stiffness of the coupling is provided and, as a result, high sealing performance is provided if $T \cdot L^{1/m}$ is larger than a threshold $a_{th}$. The present inventors did extended analysis and investigation and reached the conditions m=15 and $a_{th}$=1.4, and made the threaded connection according to the embodiment.

The threaded connection according to the embodiment is a threaded connection for connecting pipes for an oil wells. The threaded connection includes two pins and a tubular coupling. Each of the pins is provided on an end of a corresponding one of the pipes and is in continuity with a body of the corresponding one of the pipes having a wall thickness not smaller than 12 mm. The coupling includes two boxes and a recess portion. The boxes are provided on both ends of the coupling. Each of the boxes are capable of being made up on the associated pin. The recess portion is located between the two boxes. Each of the pins includes a nose, a pin shoulder surface, a male thread, and a pin sealing surface. The nose forms a tip portion of the pin. An outer peripheral surface of the nose is not in contact with the box made up on the pin as made up. The pin shoulder surface is formed at a tip surface of the nose. The male thread is provided on an outer peripheral surface of the pin and located closer to the body of the corresponding pipe than the nose. The male thread is a tapered thread. The pin sealing surface is provided on the outer peripheral surface of the pin and located between the nose and the male thread. Each of the boxes includes a female thread, a box shoulder surface, and a box sealing surface. The female thread is provided on an inner peripheral surface of the coupling to correspond to the male thread. The female thread is a tapered thread. The box shoulder surface is located closer to a middle of the coupling as determined along a pipe-axis direction than the female thread. The box shoulder surface is in contact with the pin shoulder surface when the connection has been made up to form a shoulder. The box sealing surface is provided on the inner peripheral surface of the coupling and is located between the female thread and the box shoulder surface. The box sealing surface is in contact with the pin sealing surface when the connection has been made up to form a seal. The recess portion has a length not smaller than 10 mm as measured in the pipe-axis direction. The connection has a connection efficiency smaller than 1. The connection efficiency is calculated by A1/A2, where A1 is the area of a transverse section of the coupling as measured at the ends, adjacent to the seal, of the male thread and the female thread engaging each other when the connection has been made up, and A2 is the area of a transverse section of the body. When the wall thickness of the body is expressed as $t_{pipe}$, the wall thickness of the recess portion and the length of the recess portion as measured in the pipe-axis direction are expressed as $t_1$ and $2 \times L_1$, respectively, and the length of each of the boxes as measured in the pipe-axis direction is expressed as $L_2$, and when the following expression (1) defines T and the following expression (2) defines L, T and L satisfy the following expression (3).

$$T = \frac{t_1}{t_{pipe}} \qquad (1)$$

$$L = \frac{L_1}{L_1 + L_2} \qquad (2)$$

$$T \cdot L^{1/15} > 1.4 \qquad (3)$$

In the threaded connection disclosed above, the recess portion has a wall thickness and a length as measured in the pipe-axis direction that satisfy expression (3). This construction will increase the stiffness of the coupling. This will prevent the box from being deformed with increased diameter during application of the internal pressure, thereby preventing the contact force of the box sealing surface on the pin sealing surface from decreasing. The outer diameter of the coupling need not be changed to satisfy expression (3). Thus, the above-disclosed threaded connection will provide high sealing performance without increasing the outer diameter of the coupling.

The embodiment will now be described with reference to the drawings. The same and corresponding elements in the drawings are labeled with the same characters, and the same description will not be repeated. For ease of explanation, the drawings may show elements in a simplified or schematic manner, or may not show some elements.

[Overall Construction]

Figure 5:
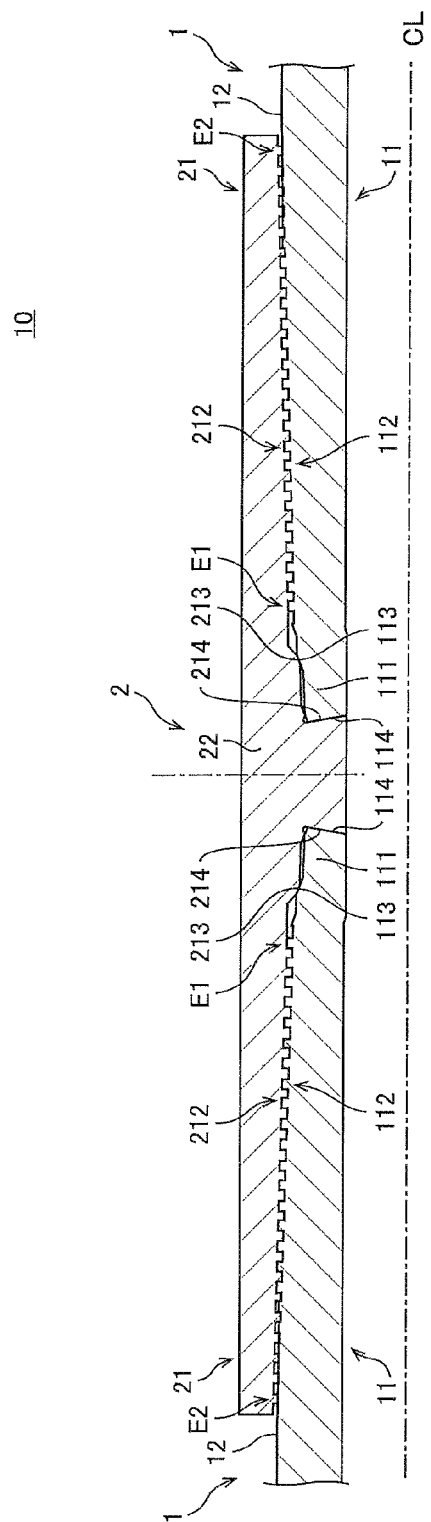
FIG. 5 is a schematic cross-sectional view of a threaded connection according to an embodiment.

FIG. 5 is a schematic longitudinal cross-sectional view of a threaded connection 10 according to the embodiment. As discussed further below in detail, the threaded connection 10 is a so-called slim-type threaded connection. The threaded connection 10 connects pipes for oil wells 1 by means of a tubular coupling 2. Each of the pipes for oil wells 1 is a steel pipe with a relatively large wall thickness. In each of the pipes for oil wells 1, the pipe body 12 has a wall thickness equal to or larger than 12 mm.

As shown in FIG. 5, the threaded connection 10 includes two pins 11 and a tubular coupling 2. Each of the pins 11 is provided on an end of the pipe for oil wells 1, and is in continuity with the pipe body 12. The coupling 2 includes two boxes 21 and a recess portion 22. The boxes 21 are provided on both ends of the coupling 2. Each of the boxes 21 is made up on the associated pin 11. For ease of explanation, as determined along the pipe-axis direction of the threaded connection 10, the direction toward the tip of the pin 11 may be referred to as inward direction, and the direction toward the pipe body 12 as outward direction.

Each of the pins 11 includes a nose 111, a male thread 112, a pin sealing surface 113 and a pin shoulder surface 114.

The nose 111 is located closer to the tip of the pin 11 than the male thread 112 and pin seal surface 113 are. The nose 111 constitutes a tip portion of the pin 11. When the pin 11 and box 21 have been made up, the outer peripheral surface of the nose 111 is not contact with the box 21. That is, when the connection has been made up, the outer diameter of the nose 111 is smaller than the inner diameter of the portion of the box 21 that faces the nose 111. For example, the outer peripheral surface of the nose 111 may be formed by a concave surface recessed toward the inner periphery of the pin 11 relative to the pin sealing surface 113.

The male thread 112 is provided on the outer peripheral surface of the pin 11. On the pin 11, the male thread 112 is located closer to the pipe body 12 than the nose 111 is. The male thread 112 is constituted by a tapered thread. A pin sealing surface 113 is provided on the outer periphery of the pin 11 and located between the nose 111 and male thread 112.

The pin sealing surface 113 is generally a tapered surface that decreases its diameter as it goes from the male thread 112 toward the nose 111. The pin sealing surface 113 is formed by, for example, the periphery of a solid of revolution obtained by rotating an arc about the pipe axis CL or the periphery of a truncated cone whose axis is represented by the pipe axis CL, or a combination of two or more such peripheries.

The pin shoulder surface 114 is a toroidal surface formed by a tip surface of the nose 111. According to the present embodiment, the pin shoulder surface 114 is sloped such that its outer periphery is located closer to the tip of the pin 11 than its inner periphery. That is, in a cross-sectional view of the pin 11 taken along a plane containing the pipe axis CL, the pin shoulder surface 114 is shaped such that its outer periphery is inclined toward the direction of advance during screw-in of the pin 11. However, the pin shoulder surface 114 is not limited to such a shape. The pin shoulder surface 114 may be substantially perpendicular to the pipe axis CL.

Each of the boxes 21 includes a female thread 212, a box sealing surface 213 and a box shoulder surface 214.

The female thread 212 corresponds to the male thread 112 of the pin 11 and provided on the inner peripheral surface of the box 21. The female thread 212 is constituted by a thread that mates the thread constituting the male thread 112. The female thread 212 is constituted by a tapered thread.

The box sealing surface 213 corresponds to the pin sealing surface 113 and is provided on the inner periphery of the box 21. The box sealing surface 213 is in contact with the pin sealing surface 113 when the pin 11 and box 21 have been made up.

The pin sealing surface 113 and box sealing surface 213 have an amount of interference. That is, when the connection is not made up, the diameter of the pin sealing surface 113 is slightly larger than the diameter of the box sealing surface 213. As such, as the pin 11 is screwed into the box 21, the pin and box sealing surfaces 113 and 213 contact each other and, when the connection has been made up, fittingly adhere to each other to achieve an interference fit. Thus, the pin and box sealing surfaces 113 and 213 form a seal using metal-to-metal contact.

The box shoulder surface 214 corresponds to the pin shoulder surface 114 and is provided on the inner end of the box 21 as determined along the pipe-axis direction. The box shoulder surface 214 is in contact with the pin shoulder surface 114 when the connection has been made up.

As the pin 11 is screwed into the box 21, the pin and box shoulder surfaces 114 and 214 contact each other and are pressed against each other. The pin and box shoulder surfaces 114 and 214, in press contact with each other, constitute a shoulder.

The area of contact between the pin and box shoulder surfaces 114 and 214, i.e. area of the shoulder, is preferably not smaller than 30% of the area of a transverse section of the pipe body 12. Transverse section means a cross section taken along a plane perpendicular to the pipe axis CL. If the area of the shoulder is not smaller than 30% of a transverse section of the pipe body 12, this reduces the plastic deformation of the pin shoulder surface 114 and the adjacent pin seal surface 113 occurring when an excessive compression load is applied to the threaded connection 10. This will stabilize the seal in terms of contact, thereby preventing the contact surface pressure of the seal from decreasing.

Although not limiting, the area of the shoulder is preferably not larger than 60% of a transverse section of the pipe body 12 to prevent the minimum cross section of the coupling 2 from decreasing.

As discussed above, the threaded connection 10 is a so-called slim-type threaded connection. Thus, the threaded connection 10 has a connection efficiency smaller than 1. The connection efficiency is calculated by A1/A2, where A1 is the area of a transverse section of the portion of the coupling 2 that has the smallest area of resistance to a tensile load when the connection has been made up (i.e. critical section), and A2 is the area of a transverse section of the pipe body.

The male and female threads 112 and 212 have ends of their engaged length, E1 and E2, when the connection has been made up. The area A1 of the critical section of the coupling 2 is the area of the transverse section of the coupling 2 as measured at the end E1 of the engaged length, which is located adjacent to the seal.

The portion of the coupling 2 located between the two boxes 21 forms the recess portion 22. The inner diameter of the recess portion 22 is substantially constant. The outer diameter of the coupling 2 is also substantially constant. Thus, the recess portion 22 has a wall thickness that is substantially uniform. The wall thickness of the recess portion 22 is larger than the wall thickness of the box 21. Thus, the recess portion 22 has a higher stiffness than the box 21.

The inner diameter of the recess portion 22 is preferably smaller than the inner diameter of the pipe body 12. This increases the wall thickness of the recess portion 22 and increases its stiffness. However, if there is a bump, between the pin 11 and recess portion 22, on the inner peripheral surface of the threaded connection 10 when the connection has been made up, a turbulent flow is generated in internal fluid as it passes through the threaded connection 10. This may not only decrease the productivity of the well, but also damage the threaded connection 10. Thus, it is preferable that the inner diameter of the recess portion 22 is substantially equal to the inner diameter of the tip of the pin 11.

To make the inner diameter of the tip of the pin 11 equal to the inner diameter of the recess portion 22, for example, drawing may be performed to make the inner diameter of the tip of the pin 11 smaller than the inner diameter of the pipe body 12. This increases the wall thickness of the portion of the pin 11 that is located closer to the tip than the male thread 112 is (i.e. lip). This increases the stiffness of the lip of the pin 11. This increases the contact force of the seal, thereby further improving the sealing performance of the threaded connection 10.

The length of the recess portion 22 is not smaller than 10 mm. The length of the portion of the coupling 2 that is located between the inner end of one box shoulder surface 214 and the inner end of the other box shoulder surface 214, as measured in the pipe-axis direction, will be referred to as length of the recess portion 22. If the recess portion 22 has a length of at least 10 mm, this prevents the deformation of the shoulder occurring when the one box 21 and the associated pin 11 are made up from affecting the make-up of the other box 21 and associated pin 11, thereby preventing improper make-up. This will prevent the sealing performance of the threaded connection 10 from decreasing.

The longer the recess portion 22, the higher the stiffness of the coupling 2 becomes, improving the sealing performance of the threaded connection 10. However, if the recess portion 22 has a certain length, saturation is reached in terms of the effect of improving sealing performance. Thus, the length of the recess portion 22 may be, for example, 100 mm at most.

The wall thickness and length of the recess portion 22 is such that the coupling 2 has a necessary stiffness. More specifically, the parameters T and L relating to the wall thickness and length of the recess portion 22 are defined by the following expressions (1) and (2), and T and L are set to satisfy the following expression (3):

$$T = \frac{t_1}{t_{pipe}} \qquad (1)$$

$$L = \frac{L_1}{L_1 + L_2} \qquad (2)$$

$$T \cdot L^{1/15} > 1.4 \qquad (3)$$

While the wall thickness of the recess portion 22 is substantially constant, $t_1$ in expression (1) is defined as the wall thickness of the recess portion 22 as measured at the middle thereof as determined along the pipe-axis direction. That is, $t_1$ is the wall thickness of the coupling 2 as measured at the intermediate position between the two box shoulder surfaces 214. $t_{pipe}$ is the wall thickness of the pipe body 12.

$L_1$ in expression (2) is the distance between the innermost point of a box shoulder surface 214 and the middle of the coupling 2 as measured in the pipe-axis direction. That is, the length of the recess portion 22 as measured in the pipe-axis direction may be given by $2 \times L_1$. $2 \times L_1$ is equal to the minimum distance between the opposite box shoulder surfaces 214.

$L_2$ in expression (2) is the length of each box 21 as measured in the pipe-axis direction. $L_2$ is the distance between an end of the coupling 2 and the innermost point of the associated box shoulder surface 214.

To calculate T and L based on expressions (1) and (2), the variables may be in any units; however, $t_1$ and $t_{pipe}$ must be in one and the same unit, and $L_1$ and $L_2$ must be in one and the same unit.

[Effects]

According to the present embodiment, the wall thickness of the recess portion 22 of the coupling 2 and the length thereof as measured in the pipe-axis direction are such that expression (3) is satisfied. The outer diameter of the coupling 2 need not be adjusted to satisfy expression (3). This will improve the stiffness of the coupling 2 without increasing the outer diameter of the coupling 2. Thus, even in a slim-type threaded connection, which has tight restrictions on the outer-diameter dimensions, the deformation with increased diameter of each box 21 during application of the internal pressure can be prevented, thereby maintaining the contact force of the seal. This will provide high sealing performance.

Generally, if the wall thickness of the pipe body is 15 mm or larger, the load applied to the connection is increased such that the box can more easily be deformed. On the other hand, in the threaded connection 10 according to the present embodiment, the wall thickness and length of the recess portion 22 are adjusted to improve the stiffness of the coupling 2, thereby preventing deformation of the box 21. This suggests that the threaded connection 10 will also be very effective if the wall thickness of the pipe body is 15 mm or larger.

A slim-type threaded connection typically has a connection efficiency smaller than 1 and has a relative low stiffness. Particularly, if the connection efficiency is not higher than 0.8, the stiffness of the threaded connection is insufficient such that the sealing performance can easily decrease. On the other hand, in the threaded connection 10 according to the present embodiment, the wall thickness and length of the recess portion 22 are adjusted to improve the stiffness of the coupling 2. This suggests that the threaded connection 10 will also be very effective if the connection efficiency is not higher than 0.8.

[Variations]

Although an embodiment has been described, the present disclosure is not limited to the above-described embodiment, and various modifications are possible without departing from the spirit of the disclosure. For example, although the threaded connection 10 according to the present embodiment includes a single seal, it may include two or more seals.

Figure 6:
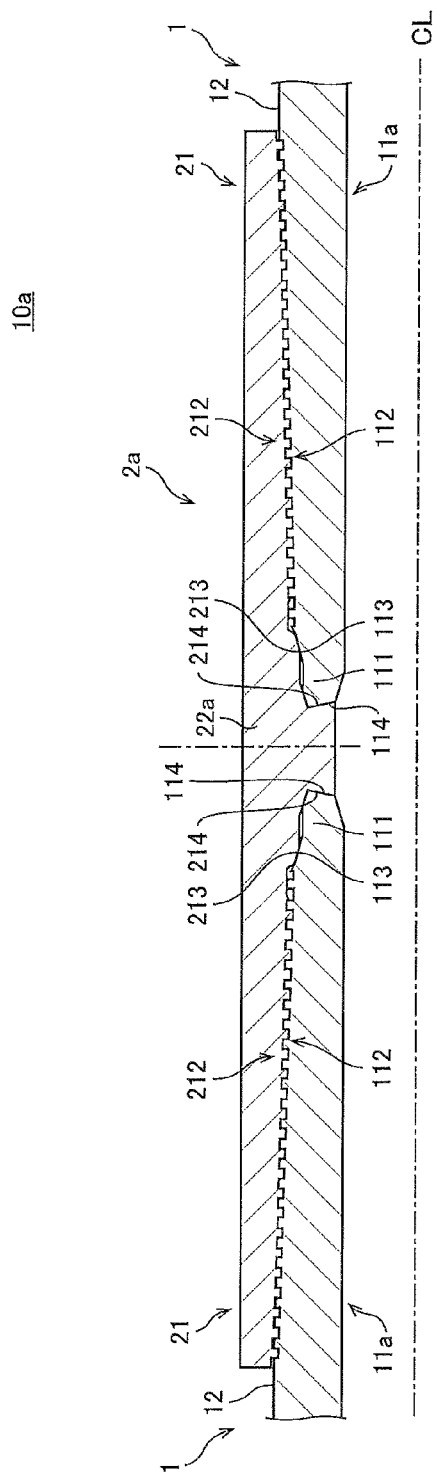
FIG. 6 is a schematic longitudinal cross-sectional view of a threaded connection according to a variation of the embodiment.

According to the above-described embodiment, the inner diameter of the tip of the pin 11 and the inner diameter of the recess portion 22 of the coupling 2 are smaller than the inner diameter of the pipe body 12. However, as in the threaded connection 10a shown in FIG. 6, the inner diameter of the tip of the pin 11a and the inner diameter of the recess portion 22a of the coupling 2a may be not smaller than the inner diameter of the pipe body 12. In such implementations, too, it is preferable that the inner diameter of the tip of the pin 11a is substantially equal to the inner diameter of the recess portion 22a when the connection has been made up.

EXAMPLES

To verify the effects of the threaded connection according to the present disclosure, physical seal tests and a numerical analysis using the elastic-plastic finite element method were conducted.

[Physical Seal Testing]

Two specimens of the coupling-type threaded connection having the basic construction shown in FIG. 5 were prepared and physical seal tests were conducted. The conditions common to these specimens are described below.

Used pipe: 8⅝"57.4 #steel pipe (with an outer diameter of 219.1 mm and a wall thickness of 16.3 mm)

Steel material: carbon steel Q125 according to the API standards (with a nominal yield stress of 125 ksi (=862 MPa))

Thread: every thread had a thread pitch of 5.08 mm, a load-flank angle of −3°, a stab-flank angle of 10° and a stab-flank clearance of 0.15 mm For the seal tests, the surface treatment for the pin was "as cut" and the surface treatment for the box was manganese phosphate-based treatment, and API dope was applied to the entire surfaces of the connection. The seal tests were conducted in accordance with ISO 13679:2011, and the maximum tensile load applied to the connection was 75% of the tensile-yield load of the pipe body.

As shown in Table 1, the two specimens have different values of $T \cdot L^{1/15}$ calculated by expression (3).

TABLE 1

| Specimen | Connection efficiency | T (wall thickness of recess base/ wall thickness of pipe body) | L (length of recess base/ length of coupling) | $T \cdot L^{1/15}$ | Seal test result |
|---|---|---|---|---|---|
| comp. ex. 1 | 0.75 | 1.60 | 0.08 | 1.36 | leak |
| inv. ex. 1 | 0.82 | 1.69 | 0.08 | 1.43 | passed |

As shown in Table 1, in the specimen of comparative example 1, a leak occurred during the seal test. In the specimen of comparative example 1, $T \cdot L^{1/15}$ was smaller than 1.4 and did not satisfy expression (3), which is presumably the reason why the stiffness of the recess portion of the coupling was insufficient.

In contrast, the specimen of inventive example 1 passed the seal test as no leak occurred during the seal test. In the specimen of inventive example 1, $T \cdot L^{1/15}$ was larger than 1.4 and satisfied expression (3), which is presumably the reason why the stiffness of the recess portion of the coupling was sufficiently high.

(Numerical Analysis Using Elastic-Plastic Finite Element Method)

A numerical analysis using the elastic-plastic finite element method was conducted for a plurality of specimens, shown in Table 2. After the make-up of the threads for each specimen was analyzed, a load simulating the ISO13679 CAL4 Series A test was applied, and the sealing performance against each of the internal and external pressures was evaluated. Sealing performance was evaluated based on the minimum value of the average contact surface pressure of the seal in the load history (i.e. minimum seal average contact surface pressure). A higher value of the minimum seal average contact surface pressure means a better sealing performance of the seal. The elastic-plastic finite element analysis used models in which the material was an isotropically hardened elastic-plastic material and the elastic modulus was 210 GPa and the yield strength was 125 ksi (=862 MPa) with a proof stress of 0.2%.

TABLE 2

| Specimen | Connection efficiency | T (wall thickness of recess base/ wall thickness of pipe body) | Length of recess base [mm] | Length of coupling [mm] | L (length of recess base/ length of coupling) | $T \cdot L^{1/15}$ | Minimum seal average contact surface pressure [MPa] | Sealing performance |
|---|---|---|---|---|---|---|---|---|
| comp. ex. 2-1 | 0.75 | 1.60 | 25 | 320 | 0.08 | 1.35 | 466.0 | poor |
| inv. ex. 2-1 | 0.75 | 1.60 | 50 | 345 | 0.14 | 1.41 | 515.5 | good |
| inv. ex. 2-2 | 0.75 | 1.60 | 75 | 370 | 0.20 | 1.44 | 536.7 | good |
| comp. ex. 2-2 | 0.79 | 1.65 | 25 | 320 | 0.08 | 1.39 | 480.8 | poor |
| inv. ex. 2-3 | 0.79 | 1.65 | 50 | 345 | 0.14 | 1.45 | 517.4 | good |
| inv. ex. 2-4 | 0.79 | 1.65 | 75 | 370 | 0.20 | 1.48 | 525.2 | good |
| inv. ex. 2-5 | 0.82 | 1.69 | 25 | 320 | 0.08 | 1.43 | 500.2 | good |
| inv. ex. 2-6 | 0.82 | 1.69 | 50 | 345 | 0.14 | 1.49 | 511.8 | good |
| inv. ex. 2-7 | 0.82 | 1.69 | 75 | 370 | 0.20 | 1.52 | 531.6 | good |

Each of the specimens illustrated in Table 2 is a coupling-type threaded connection having the basic construction shown in FIG. 5, but they have different coupling dimensions. The elastic-plastic finite element analysis was conducted while the length of the recess portion and the outer diameter of the coupling were varied. The used pipe, steel material, and thread conditions were common to all the specimens and were the same as those of the above-discussed physical seal tests.

The specimen of inventive example 2-5 had a coupling dimension equal to that of the specimen of inventive example 1, which passed the physical seal test. As the minimum seal average contact surface pressure of the specimen of inventive example 2-5 was not smaller than 500 MPa, those specimens with minimum seal average contact surface pressure values not lower than 500 MPa were determined to have good sealing performance, and those with values below 500 MPa were determined to have poor sealing performance.

In each of the specimens of comparative examples 2-1 and 2-2, the minimum seal average contact surface pressure was smaller than 500 MPa, meaning poor sealing performance. In each of the specimen of comparative examples 2-1 and 2-2, $T \cdot L^{1/15}$ was smaller than 1.4, suggesting that the stiffness of the recess portion of the coupling was insufficient.

In contrast, in each of the specimens of inventive examples 2-1 to 2-7, the minimum seal average contact surface pressure was not lower than 500 Pa, meaning good sealing performance. In each of the specimens of inventive examples 2-1 to 2-7, $T \cdot L^{1/15}$ was larger than 1.4, suggesting that the stiffness of the recess portion of the coupling was sufficient.

The above-discussed physical seal tests and elastic-plastic finite element analysis demonstrate that good sealing performance can be achieved if $T \cdot L^{1/15} > 1.4$.

The invention claimed is:

1. A threaded connection for connecting pipes for an oil well, comprising:

two pins each provided on an end of a corresponding one of the pipes and in continuity with a body of the corresponding pipe having a wall thickness not smaller than 12 mm; and a tubular coupling including two boxes and a recess portion, the boxes being provided on both ends of the coupling, each of the boxes being capable of being made up on the associated pin, the recess portion being located between the two boxes, each of the pins including:
a nose forming a tip portion of the pin, an outer peripheral surface of the nose being not in contact with the box made up on the pin;
a pin shoulder surface being formed at a tip surface of the nose;
a male thread provided on an outer peripheral surface of the pin and located closer to the body of the corresponding pipe than the nose, the male thread being a tapered thread; and
a pin sealing surface provided on the outer peripheral surface of the pin and located between the nose and the male thread, each of the boxes including:
a female thread provided on an inner peripheral surface of the coupling to correspond to the male thread, the female thread being a tapered thread;
a box shoulder surface located closer to a middle of the coupling as determined along a pipe-axis direction than the female thread, the box shoulder surface being in contact with the pin shoulder surface when the connection has been made up to form a shoulder; and
a box sealing surface provided on the inner peripheral surface of the coupling and located between the female thread and the box shoulder surface, the box sealing surface being in contact with the pin sealing surface when the connection has been made up to form a seal, wherein the recess portion has a length not smaller than 10 mm as measured in the pipe-axis direction, the connection has a connection efficiency smaller than 1, the connection efficiency being calculated by A1/A2, where A1 is the area of a transverse section of the coupling as measured at the ends, adjacent to the seal, of the male thread and the female thread engaging each other when the connection has been made up, and A2 is the area of a transverse section of the body, and, when the wall thickness of the body is expressed as $t_{pipe}$, the wall thickness of the recess portion and the length of the recess portion as measured in the pipe-axis direction are expressed as $t_1$ and $2 \times L_1$, respectively, and the length of each of the boxes as measured in the pipe-axis direction is expressed as $L_2$, and when the following expression (1) defines T and the following expression (2) defines L, T and L satisfy the following expression (3):

$$T = \frac{t_1}{t_{pipe}} \qquad (1)$$

$$L = \frac{L_1}{L_1 + L_2} \qquad (2)$$

$$T \cdot L^{1/15} > 1.4. \qquad (3)$$

* * * * *